United States Patent
Patel (10) Patent No.: US 12,093,146 B2
(45) Date of Patent: *Sep. 17, 2024

(54) METHOD AND APPARATUS FOR GENERATING LOG DATA HAVING INCREASED FILTERABILITY

(71) Applicant: MALIKIE INNOVATIONS LIMITED, Dublin (IE)

(72) Inventor: Dhanishchandra Harishbhai Patel, Mississauga (CA)

(73) Assignee: Malikie Innovations Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,898

(22) Filed: Jul. 7, 2023

(65) Prior Publication Data

US 2023/0350769 A1 Nov. 2, 2023

Related U.S. Application Data

(63) Continuation of application No. 16/226,050, filed on Dec. 19, 2018, now Pat. No. 11,740,981.

(51) Int. Cl.
| | |
|---|---|
| *G06F 11/00* | (2006.01) |
| *G06F 9/54* | (2006.01) |
| *G06F 11/14* | (2006.01) |
| *G06F 11/34* | (2006.01) |
| *G06F 16/9035* | (2019.01) |
| *G06F 16/9038* | (2019.01) |

(52) U.S. Cl.
CPC .......... *G06F 11/1471* (2013.01); *G06F 9/542* (2013.01); *G06F 11/3476* (2013.01); *G06F 16/9035* (2019.01); *G06F 16/9038* (2019.01)

(58) Field of Classification Search
None
See application file for complete search history.

(56) References Cited

U.S. PATENT DOCUMENTS

| | | |
|---|---|---|
| 8,413,250 B1 | 4/2013 | Krynski |
| 8,438,270 B2 | 5/2013 | Nappier et al. |
| | (Continued) | |

OTHER PUBLICATIONS

Google Scholar/Patents search—text refined (Year: 2024).*

(Continued)

*Primary Examiner* — Christopher S McCarthy
(74) *Attorney, Agent, or Firm* — Botos Churchill IP Law LLP (57) ABSTRACT

A method and system includes generating event logs, storing in a database log data comprising the generated event logs, identifying a first set of log data by searching the log data for a first log data type, the first log data type having a data structure that includes a generic identifier and a specific data, identifying pairs of generic identifiers and associated specific data in the first set of log data, for each generic identifier of the identified pairs identifying a second set of log data that include the generic identifier but not the specific data, wherein identifying the second set of log data is performed by searching the log data for event logs that include the generic identifier, and updating log data stored in the database by adding, for each of the event logs of the identified second set of log data, the specific data associated with the generic identifier.

18 Claims, 6 Drawing Sheets

(56) References Cited

U.S. PATENT DOCUMENTS

| | | |
|---|---|---|
| 9,798,607 B1 | 10/2017 | Kulkarni et al. |
| 2012/0246303 A1 | 9/2012 | Petersen et al. |
| 2014/0082513 A1 | 3/2014 | Mills et al. |
| 2014/0279893 A1 | 9/2014 | Branton |
| 2018/0210802 A1 | 7/2018 | Anderson et al. |
| 2018/0232425 A1 | 8/2018 | Das et al. |

OTHER PUBLICATIONS

European Patent Application No. EP19216060.4, Extended European Search Report dated May 7, 2020.
Google Scholar/Patents—text refined (Year: 2021).
Google Scholar/Patents search—text refined (Year: 2023).
Google Search—see attached (Year: 2020).
"Enriching Data with Lookups", Printout of "Enriching Data with Lookups", Logstash Reference [6.4], Elastic, 8 pages retrieved on Aug. 23, 2018 from https://www.elastic.co/guide/en/logstash/current/lookup-enrichment.html, 8 pages.
Office Action for Canadian Patent Application No. 3,063,933, Sep. 22, 2023, 4 Pages.

\* cited by examiner

402 {
2018-08-22T10:30:32.662-0400 - CORE Exchange[Body: DeviceActionEvent ⟵ 406
{"eventTypeId":"259dda9291bbc8ca59f659d25f33fd2a","timestamp":1534946232613,"tenantId":1,"tenant
Guid":"8fb831d2-42d6-4379-a1e2-
54a99845cd42","externalTenantId":"S41023817",**"correlationId":"7f39f23e-fd34-4c5d-ba54-
4012ad1e9e9"**,"hostName":"bts09ykf.rim.net","version":"5.40.37","severity":"CLEARED","tags":["device_ac
tion","user","userdevice"],"userDeviceInfo":{"enrollmentType":"USER_PRIVACY_GOOD","perimeterUuid": ⟵ 408
cf830779-5c65-4c57-b055-168526df896e","userInfo":{**"userGuid":"67a85ddd-caed-4f2c-9a03-
aef8e9e36087","userName":"firstnamelastname","emailAddress":"firstnamelastname@company.com"**}, ⟵ 409
"deviceInfo":{"deviceOSFamily":"WP","id":385,"guid":"fbebb3f4-1312-49c8-82eb-
f939583664be","udid":null},"perimeterState":"ENROLLED"},"deviceActionType":"SEND_POLICY"}]
          412              414                      410

2018-08-22T10:30:51.642-0400 - CORE {reconciliationCRRequestNotifyAuditor-thread-1 :   ⟵ 418a
reconciliationCRRequestNotifyQueueConsumer} none|core [{{Correlation-Id,6aa80824-65cf-4546-9e5f-
5cc26f017a60}{correlationId,8663ae98-df10-49b8-b8e1-31180733f3b7}}] - DEBUG Notify perimeter
Identifiers: [cf830779-5c65-4c57-b055-168526df896e]

2018-08-22T10:30:51.704-0400 - CORE {reconciliationNotifyAuditor-thread-1 :   ⟵ 418b
reconciliationNotifyQueueConsumer} none|reconciliation [{{Correlation-Id,6aa80824-65cf-4546-9e5f-
5cc26f017a60}{correlationId,8663ae98-df10-49b8-b8e1-31180733f3b7}}] - DEBUG From effective policy:
[userDevice = cf830779-5c65-4c57-b055-168526df896e, categoryType = COMPLIANCE,
numOfPolicyReturned = 0]

2018-08-22T10:30:51.863-0400 - CORE {reconciliationNotifyAuditor-thread-1 :   ⟵ 418c
reconciliationNotifyQueueConsumer} none|reconciliation [{{Correlation-Id,6aa80824-65cf-4546-9e5f-
5cc26f017a60}{correlationId,8663ae98-df10-49b8-b8e1-31180733f3b7}}] - DEBUG RECONCILIATION:
CrManager.resolve() [userDevice perimeter = cf830779-5c65-4c57-b055-168526df896e, configObjectType =
SOFTWARE_CONFIGURATION]

2018-08-22T10:30:51.972-0400 - CORE {reconciliationNotifyAuditor-thread-1 :   ⟵ 418d
reconciliationNotifyQueueConsumer} none|core [{{Correlation-Id,6aa80824-65cf-4546-9e5f-
5cc26f017a60}{correlationId,8663ae98-df10-49b8-b8e1-31180733f3b7}}] - DEBUG Done trigger compliance
enforcement for perimeterUUID: cf830779-5c65-4c57-b055-168526df896e, userDevice: **cf830779-5c65-
4c57-b055-168526df896e**, triggerType: SW_CONFIG_CHANGE

FIG. 4B

420 {
422a
2018-08-22T10:30:32.457-0400 - CORE {reconciliationDeviceActionNotifyAuditor-thread-1 : reconciliationDeviceActionNotifyQueueConsumer} none|core [{{Correlation-Id,7f39f23e-fd34-4c5d-ba54-04012ad1e9e9}{correlationId,16db7916-40ae-41fe-973c-9b0a85ac2974}}] - DEBUG starting runner 422b
2018-08-22T10:30:32.551-0400 - CORE {reconciliationDeviceActionNotifyAuditor-thread-1 : reconciliationDeviceActionNotifyQueueConsumer} none|reconciliation [{{Correlation-Id,7f39f23e-fd34-4c5d-ba54-04012ad1e9e9}{correlationId,16db7916-40ae-41fe-973c-9b0a85ac2974}}] - DEBUG batchProcessStatus: [keySet = [314438da-0409-44b7-ac8f-5e8dda2149d3], entrySet = [314438da-0409-44b7-ac8f-5e8dda2149d3=1]]

422c
2018-08-22T10:30:32.551-0400 - CORE {reconciliationDeviceActionNotifyAuditor-thread-1 : reconciliationDeviceActionNotifyQueueConsumer} none|reconciliation [{{Correlation-Id,7f39f23e-fd34-4c5d-ba54-04012ad1e9e9}{correlationId,16db7916-40ae-41fe-973c-9b0a85ac2974}}] - DEBUG Deleted backup batch: [batchGuid = 314438da-0409-44b7-ac8f-5e8dda2149d3]

422d
2018-08-22T10:30:32.582-0400 - CORE {reconciliationDeviceActionNotifyAuditor-thread-1 : reconciliationDeviceActionNotifyQueueConsumer} none|notification [{{Correlation-Id,7f39f23e-fd34-4c5d-ba54-04012ad1e9e9}{correlationId,16db7916-40ae-41fe-973c-9b0a85ac2974}}] - DEBUG Detected WP and action SEND_POLICY does not support notifications. Not sending poke.

422e
2018-08-22T10:30:32.644-0400 - CORE {reconciliationDeviceActionNotifyAuditor-thread-1 : reconciliationDeviceActionNotifyQueueConsumer} none|notification [{{Correlation-Id,7f39f23e-fd34-4c5d-ba54-04012ad1e9e9}{correlationId,16db7916-40ae-41fe-973c-9b0a85ac2974}}] - DEBUG finished runner 422f
2018-08-22T10:30:32.644-0400 - CORE {wff-thread-109 : eventingWorkflow.coreEventNotifierActivity.EventQueueConsumer} none|notification [{{Correlation-Id,7f39f23e-fd34-4c5d-ba54-04012ad1e9e9}{correlationId,16db7916-40ae-41fe-973c-9b0a85ac2974}}] - DEBUG >>>> direct://start Exchange[]

422g
2018-08-22T10:30:32.651-0400 - CORE {wff-thread-109 : eventingWorkflow.coreEventNotifierActivity.EventQueueConsumer} none|notification [{{Correlation-Id,7f39f23e-fd34-4c5d-ba54-04012ad1e9e9}{correlationId,16db7916-40ae-41fe-973c-9b0a85ac2974}}] - DEBUG Filter matches: true for exchange: Exchange[ID-bts09ykf-1531339112908-0-1233306]

422h
2018-08-22T10:30:32.658-0400 - CORE {wff-thread-109 : eventingWorkflow.coreEventNotifierActivity.EventQueueConsumer} none|notification [{{Correlation-Id,7f39f23e-fd34-4c5d-ba54-04012ad1e9e9}{correlationId,16db7916-40ae-41fe-973c-9b0a85ac2974}}] - DEBUG >>>> seda://events?concurrentConsumers=2&multipleConsumers=true Exchange[ID-bts09ykf-1531339112908-0-1233306]

METHOD AND APPARATUS FOR GENERATING LOG DATA HAVING INCREASED FILTERABILITY

FIELD

The present disclosure relates generally to generating log data having increased filterability.

BACKGROUND

Endpoint management systems are utilized to manage content and applications on endpoint devices across multiple platforms. An endpoint management system be utilized for logging, monitoring, reporting, and managing functions on endpoint devices, authentication functions of endpoint devices, scheduling and sending commands, IT policies, and profiles to endpoint devices, and sending user, policy, and other configuration data to applications on the endpoint devices.

Logging, monitoring, and managing functions on endpoint devices may include receiving logs of events at the point devices, including error logs, and storing the log data in a database. The log data stored in the database may be associated with multiple different services that are managed by the endpoint management system. When a user experiences an issue, the log data may then be analyzed to troubleshoot user-reported issue. However, because error logs that are associated with a particular user or a particular event, such as a policy push, are not generally correlated with each other, making troubleshooting difficult and time consuming.

Improvements in endpoint management are desirable.

BRIEF DESCRIPTION OF THE DRAWINGS

Embodiments of the present disclosure will now be described, by way of example only, with reference to the attached figures, in which:

FIG. 4A through 4C are event log data illustrating an example of generating log data having increased filterability in accordance with the disclosure.

DETAILED DESCRIPTION

The following describes a method and apparatus for correlating log data from endpoints in, for example, an endpoint management system. In an embodiment, the present disclosure provides a method for detecting and identifying an endpoint management event failure in an endpoint management system that includes generating event logs at the endpoint management system, storing in a database log data comprising the generated event logs, identifying a first set of log data by searching the log data for a first log data type, the first log data type having a data structure that includes at least one of an identifier associated with a user and user information, or an event log chain identifier and an action type, identifying pairs of the one of the identifier associated with a user and the user information, or the event log chain identifier and the action type, in the first set of log data, for each of the identified pairs identifying a second set of log data that include the one of the identifier associated with a user or the event log chain identifier but not the corresponding one of the user information or the action type, wherein identifying the second set of log data is performed by searching the log data for event logs that include the one of the identifier associated with a user or the event log chain identifier, and updating log data stored in the database by adding, for each of the event logs of the identified second set of log data, the one of the user information or the action type.

In an example embodiment, the method includes filtering the log data based on the one of the user information and the action type, and displaying the filtered log data.

In an example embodiment, displaying the filtered log data comprises displaying an error list that includes a predetermined number of the errors most frequently occurring in the filtered log data.

In an example embodiment, the method includes, for each error included in the error list, searching an issue tracking application for solutions to the error to determine one or more entries in the issue tracking application associated with the error, and wherein displaying the list of most common errors includes displaying, for each error included in the error list, one or more hyperlinks to the one or more entries, respectively, in the issue tracking application.

In an example embodiment, the first log data type is a DeviceActionEvent log.

In an example embodiment, the identifier associated with a user is a permeterUuid value of an endpoint associated with the user.

In an example embodiment, the identifier associated with a user is a userGuid value associated with the user.

In an example embodiment, the user information is a username or email address or both associate with the user.

In an example embodiment, the event log chain identifier is associated with event logs associated with a particular endpoint, and the method further includes adding additional information to the identified second set of event logs that include the event log chain identifier, the additional information include one or more of the operating system of the particular endpoint, an enrollment type of the particular endpoint, an enrollment state of the particular endpoint, and a serial number of the particular endpoint.

In an example embodiment, the event log chain identifier is a Correlation-ID value and the action type is a deviceActionType.

In another embodiment, the present disclosure provides a system for detecting and identifying an endpoint management event failure in an endpoint management system that includes a database, a processor in communication with the database, the processor configured to generate event logs at the endpoint management system, store in the database log data comprising the generated event logs, identify a first set of log data by searching the log data for a first log data type, the first log data type having a data structure that includes at least one of an identifier associated with a user and user information, or an event log chain identifier and an action type, identify pairs of the one of the identifier associated with a user and the user information, or the event log chain identifier and the action type, in the first set of log data, for each of the identified pairs identify a second set of log data that includes the one of the identifier associated with a user or the event log chain identifier but not the corresponding one of the user information or the action type, wherein identifying the second set of log data is performed by searching the log data for event logs that include the one of the identifier associated with a user or the event log chain identifier, and update log data stored in the database by adding, for each of the event logs of the identified second set of log data, the one of the user information or the action type.

In an example embodiment, the system includes a display in communication with the processor, and the processor further configured to filter the log data based on the one of the user information and the action type, and display on the display the filtered log data.

In an example embodiment, displaying the filtered log data comprises displaying an error list that includes a predetermined number of the errors most frequently occurring in the filtered log data.

In an example embodiment, the processor is further configured to, for each error included in the error list, search an issue tracking application for solutions to the error to determine one or more entries in the issue tracking application associated with the error, and wherein displaying the list of most common errors includes displaying, for each error included in the error list, one or more hyperlinks to the one or more entries, respectively, in the issue tracking application.

In an example embodiment, the first log data type is a DeviceActionEvent log.

In an example embodiment, the identifier associated with a user is a permeterUuid value of an endpoint associated with the user.

In an example embodiment, the identifier associated with a user is a userGuid value associated with the user.

In an example embodiment, the user information is a username or email address or both associated with the user.

In an example embodiment, the event log chain identifier is associated with event logs associated with a particular endpoint, the processor further configured to add additional information to the identified second set of event logs that include the event log chain identifier, the additional information include one or more of the operating system of the particular endpoint, an enrollment type of the particular endpoint, the enrollment status of the particular endpoint, and a serial number of the particular endpoint.

In an example embodiment, the event log chain identifier is a Correlation-ID value and the action type is a deviceActionType.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to managing endpoints, which may include portable electronic devices. Examples of electronic devices include mobile, or handheld, wireless communication devices such as cellular phones, cellular smart-phones, wireless organizers, personal digital assistants, wirelessly enabled notebook computers, tablet computers, mobile internet devices, electronic navigation devices, and so forth. Other examples of electronic devices include devices that are not handheld devices or that may not be wireless communication devices such as desktop computers.

Figure 1:
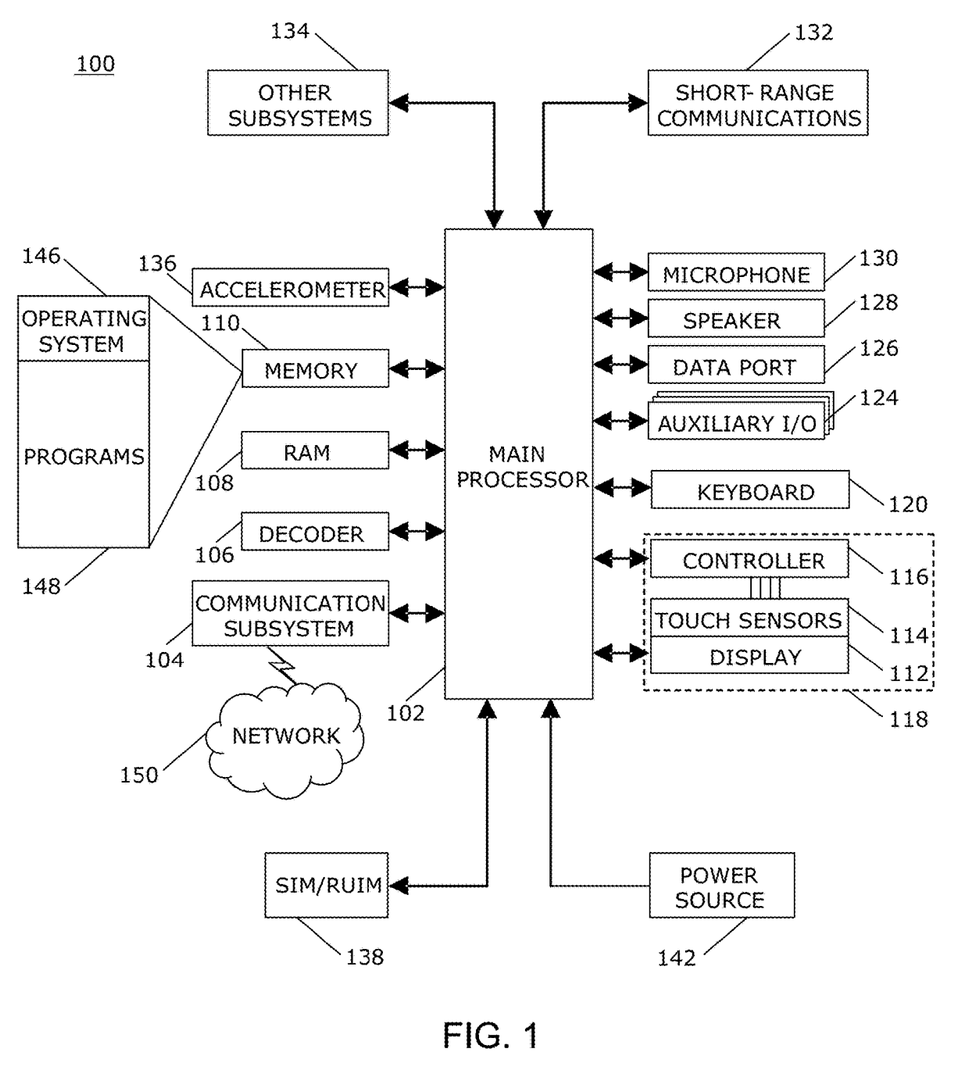
FIG. 1 is a block diagram of an example of a portable electronic device in accordance with the disclosure.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for hands-free use. The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. Alternatively, or in addition, the keys of the keyboard may include touch sensors coupled to a controller to detect touch input thereon.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

In an enterprise, endpoint electronic devices, which may be referred to herein simply as "endpoints", may be authenticated within the enterprises IT system in order to, for example, access various services of the enterprise including email, instant messaging, accessing enterprise content and enterprise directories. In order to manage such endpoints, including, for example, logging and report of endpoint functions, authenticating endpoints, and scheduling and sending commands, IT policies, and profiles to the endpoint, an endpoint management system (EMS) may be utilized.

Figure 2:
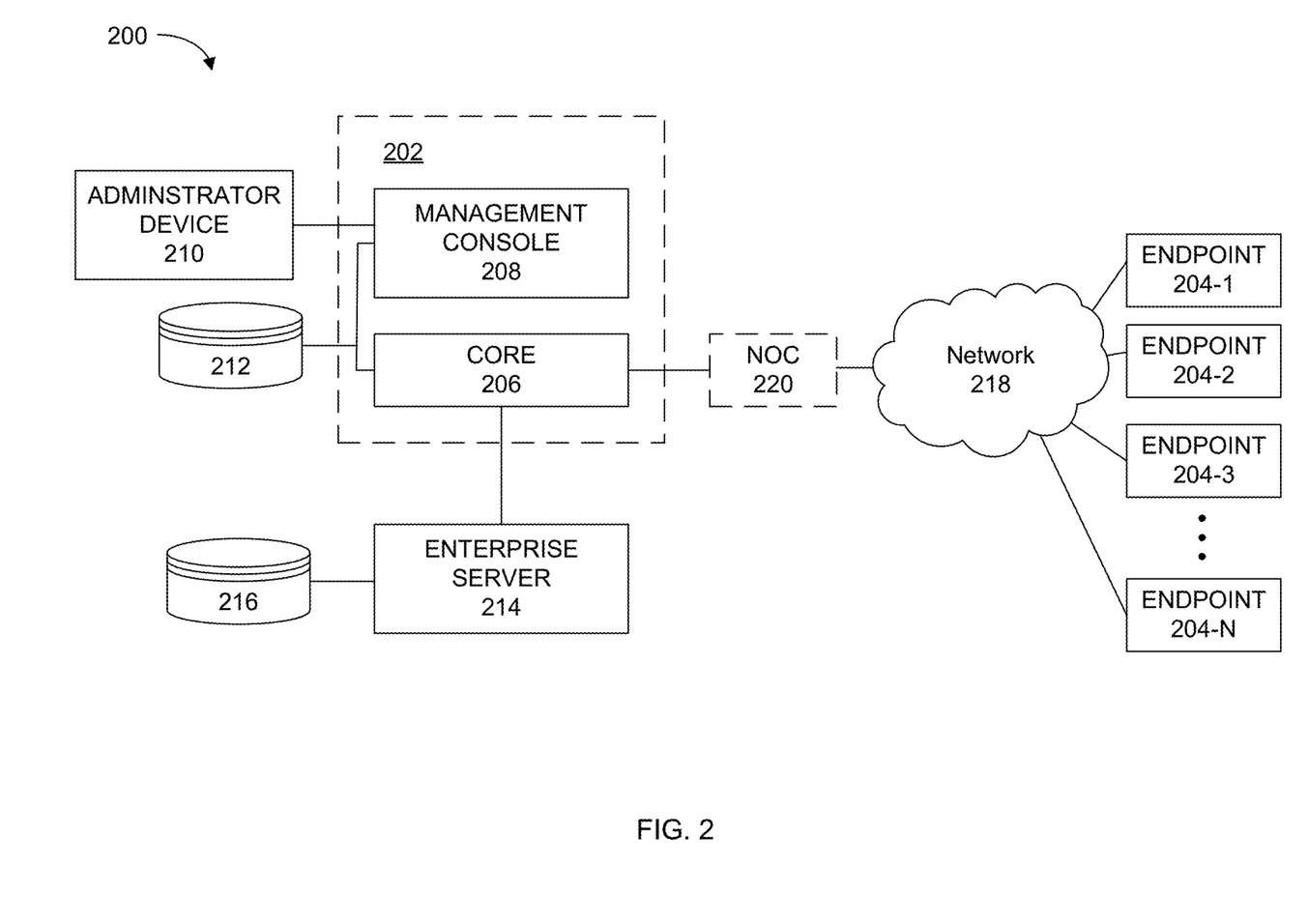
FIG. 2 is a block diagram of an example of an endpoint management system in accordance with the disclosure.

A block diagram of an example EMS 200 is shown in FIG. 2. The example EMS 200 includes an endpoint management server 202 that performs device, application, and content management functions for a plurality of endpoints 204-1 to 204-N. The endpoint management server 202 communicates with an endpoint management database 212 that may be utilized, for example, to store data that contains user account information and configuration information that the endpoint management server 202 uses to manage the endpoints 204-1 to 204-N.

The endpoint management server 202 may include multiple components including, in the example shown FIG. 2, an endpoint management core 206 and a management console 208. The endpoint management core 206 performs the core functionality of the endpoint management server 202, including for example, logging and reporting of endpoint functions, authenticating endpoints, and scheduling and sending commands, IT policies, and profiles to the endpoint.

The management console 208 may be included to provide, for example, a web-based user interface for an administrator for providing administrator access to the endpoint management server via an administrator device 210. The administrator may access the endpoint management server to, for example, manage system settings, users, devices, and applications associated with the endpoints 204-1 to 204-N. The management console 208 may also provide access to log data stored in the endpoint management database 212 to, for example, analyze the log data to resolve issues and defects experienced at the endpoints 204-1 to 204-N.

The EMS 200 may also include enterprise server 214 that communicates with an enterprise database 216. Although the enterprise server 214 and the enterprise database 216 are shown as single components, the EMS 200 may include multiple enterprise servers 214 and multiple databases 216. In an example, the enterprise servers 214 may include a directory server, a mail server, and a web server, some or all of which have an associated enterprise database 216. The enterprise server or servers 214 may provide various enterprise services to the endpoints 204-1 to 204-N including, for example, access email services, content of the enterprise such as, for example, electronic documents, instant messages, and company directories that are stored in the enterprise database or databases 216.

The endpoints 204-1 to 204-N communicate with the endpoint management server 202 and the enterprise server or servers 214 via a network 218. The network 206 may be any suitable type of communication network, including, for example, a local area network (LAN) connection, a wide area network (WAN) connection, an internet connection, a cellular connection, or any combination thereof. The network 206 may be wired, wireless, or a combination of wired and wireless.

In the example EMS 200 shown in FIG. 2, the endpoint management server 202 and the enterprise server or servers 214 communicates with the network 218 via a network operation center (NOC) 220, which may be utilized for, for example, registering user information for authentication of endpoints 204-1 to 204-N, validating licensing information, and providing cryptographic, mutual authentication for securing communications between the endpoints 204-1 to 204-N and the enterprise server or servers 214.

In general, event logs are generated by the endpoint management core 206 of the endpoint management server 202 when, for example, actions or events are triggered or scheduled in the EMS 200. Event logs may be associated with a particular one of the endpoint 204-1 to 204-N, while others are not associated with any of the endpoints 204-1 to 204-N.

In an example, an IT policy of one or more endpoints 204-1 to 204-N may be updated by an administrator initiating the update at the management console 208 via, for example, input provided at administrator device 210. The management console 208 sends the update to the endpoint management core 206, which updates the IT policy in the endpoint management database 212. A PolicyUpdateEvent event log associated with the sending of the IT policy update may be generated by the endpoint management core 206 and stored in the endpoint management database 212. In response to updating the database 212 with the updated policy, the endpoint management core 206 performs a check of which endpoints 204-1 to 204-N require an updated policy, which the endpoint management core 206 performs by transmitting a messages for the endpoints 204-1 to 204-N to trigger a response from the endpoints 204-1 to 204-N, referred to as a "check in" with the endpoint management core 206. A DeviceActionEvent event log associated with the transmission of the message to the endpoints 204-1 to 204-N may be generated by the endpoint management core 206 and stored in the database 212. When each of the endpoints 204-1 to 204-N responds to the message transmitted by the endpoint management core 206 in order to check in, the endpoint management core 206 provides the updated policy or profile to the endpoints 204-1 to 204-N, and the endpoints 204-1 to 204-N may respond back indicating the success or failure in applying the update. In response to receiving an indication of success, the endpoint management core 206 may generate a PolicyDeliveredEvent event log, and in response to receiving an indication of failure, the endpoint management core 206 may generate a PolicyDeliveredFailureEvent event log, and stores the generated event log in the database 212.

Because each of the DeviceActionEvent, PolicyDeliveredEvent, and PolicyDeliveredFailureEvent actions in the previous example are actions related to particular endpoints 204-1 to 204-N, the generated event logs generated for these actions are also associated with those particular endpoints 204-1 to 204-N. The generated event logs may be associated with a particular endpoint 204-1 to 204-N by including within the event log stored in the database 212 a device identifier unique to that particular endpoint 204-1 to 204-N. Further, the event logs generated in the previous example related to a particular one of the DeviceActionEvent, PolicyDeliveredEvent, and PolicyDeliveredFailureEvent actions may be associated with either other by, for example, all including an event log chain identifier that uniquely identifies event logs that are related to the same action, such as one of the particular DeviceActionEvent, PolicyDeliveredEvent, and PolicyDeliveredFailureEvent actions in the previous example. In this example, the event log chain identifier will be unique for each of the DeviceActionEvent, PolicyDeliveredEvent, and PolicyDeliveredFailureEvent actions.

In another example, the endpoint management server 202 may be configured to perform scheduled synchronizations with, for example, a directory of users stored in an enterprise database 216 connected to an enterprise server 214. In the event that such synchronization fails, the endpoint management core 206 may generate a DirectoryAccessFailedEvent event log, which is stored in the database 212. Because this action is not associate with any particular endpoint 204-1 to 204-N, the event log generated will not be associated with any particular endpoint 204-1 to 204-N. However, because the synchronization of users may be associated with particular users within the endpoint management system, a generated event log in this example may include a user identifier unique to a particular user to which the generated event log relates.

The endpoint management server 202, and specifically, for example, the endpoint management core 206, may store the event logs generated by the endpoint management core 206, which may be associated with the endpoints 204-1 to 204-N in the endpoint management database 212. The event logs generated by the endpoint management core 206 may be stored in the endpoint management database 212. The event logs may be stored in a log file in, for example, plain text format. Alternatively, or additionally, an indexed database may be generated and stored in the endpoint management database 212 based on the event logs in the log file. The indexed database is generated by parsing each event log generated by the endpoint management core 206 into its constituent parts, and including each constituent part into an associated field of the indexed database.

As used herein, "event log" refers to an individual event log generated by the endpoint management core in association with a particular action, and "log data" refers collectively to a stored database of generated event logs and may include stored raw log data in a log file or portion thereof, an indexed database or a portion thereof that is generated from the raw log data, or both raw log data and an indexed database or portions thereof.

If, for example, an issue arises at one or more of the endpoints 204-1 to 204-N, an administrator may access the log data stored in the endpoint management database 212 in order to determine a solution to the issue. Typically, an event log may include an identifier that identifies the particular endpoint 204-1 to 204-N or user that the event log is associated with, as described previously. Additionally, event logs that are associated with a particular activity, such as, for example, a particular action associated with a policy or application update transmitted by the endpoint management server 202, may include an event log chain identifier, which may also be referred to as a "correlation ID". An event log chain identifier, or correlation ID, is a unique identifier that is included log data entries that relate to a particular transaction or event such that all log data entries related to that transaction or event include the same event log chain identifier. These device identifiers, user identifiers, and event log chain identifiers are generally a string of alphanumeric characters.

In current endpoint management systems, identifying event logs of the stored log data that are associated with a particular endpoint, a particular user, or with a particular activity, is challenging because, for example, an administrator does not know, or may not have readily available, the device identifier for the endpoint 204-1 to 204-N associated with a particular user, the particular user's user identifier, or the event log chain identifier associated with a particular activity.

Figure 3:
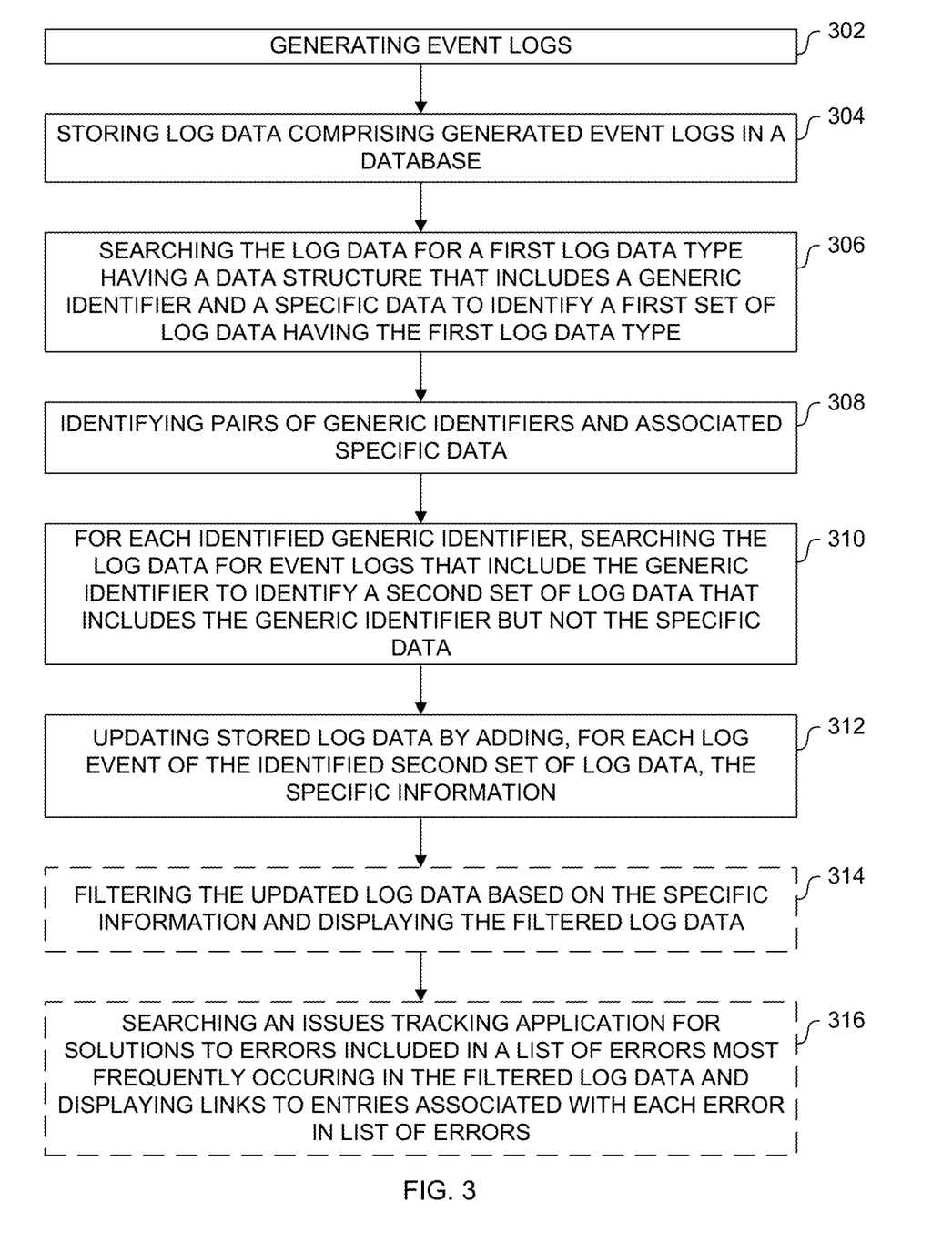
FIG. 3 is a flow chart illustrating a method of generating log data having increased filterability in accordance with the disclosure.

A flowchart illustrating a method for detecting and identifying an endpoint management event failure in an endpoint management system is shown in FIG. 3. The method may be performed at, for example, the endpoint management server 202, such as by a processor included in the endpoint management core 206, of the example EMS 200 described previously with reference to FIG. 2.

At 302, event logs are generated. The event logs may be generated by, for example, the endpoint management core 206 of the example EMS 200 described previously. An event log generated at 302 may be associated with one or more endpoints, such as for example, the endpoints 204-1 to 204-N of the example EMS 200 described previously, and may include a device identifier for each of the one or more associated endpoints. Alternatively, or additionally, an event log generated at 302 may be with one or more particular users of the endpoint management system, and may include a user identifier for each of the one or more associated users. Additionally, an event log generated at 302 may be associated with a particular transaction, event, or action, and may include an event log chain identifier associated with the particular transaction, event, or action.

At 304, log data that includes a plurality of event logs generated at 302 is stored in a database. The log data may be stored in a database such as, for example, the endpoint management database 212 described previously.

The log data that is generated at 302 and stored at 304 may be based on JavaScript Object Notation (JSON) format, and each event log may include at least a portion that is in the JSON format.

At 306, the log data is searched for a first log data type having a data structure that includes a generic identifier and data of a specific type, referred to herein as a specific data.

The search at 306 is performed to identify a set of the log data that includes event log that are of the first data type. In general, the first log data type that is searched for at 304 is a log data type that is known to include both the generic identifier as well as the specific data such that an association between the generic identifier and the specific data may be established. For example, such that an identifier associated with a user may be associated with user information, or such that the event log chain identifier may be associated with the particular action type associated with the event.

In an example, the generic identifier may be an identifier associated with a user, such as for example a device identifier for an endpoint device associated with a user or a user identifier, and the specific data may be user information, such as any of the user's name, the user's login name, or the user's email address. In this example, the first log data type that is searched at 306 may be a log data type that is known to include a device identifier or a user identifier and the user information.

In another example, the generic identifier may be an event log chain identifier and the specific data may be an action type related to the event associated with the event log chain identifier. The action type refers to the type of action or request that initiates the transaction or the event that the correlation ID references and may be, for example, a policy push or a software update transmitted by, for example, an enterprise server 214 as described above with reference to FIG. 2. In this example, the first log data type that is searched for at 306 may be a log data type that has a data structure that is known include an event log chain identifier and an action type.

In some examples, the event log chain identifier may be associated with a transaction, event, or action that relates to a single endpoint. In this example, the first log data structure may include information associated with that endpoint that is additional to the action type, i.e., the specific information. For example, the additional information in this example may include one or more of the operating system of the particular endpoint, an enrollment type of the particular endpoint, an enrollment state of the particular endpoint, and a serial number of the particular endpoint.

The first log data type that is chosen for the search at 306 depends on the specific data that is desirable, the generic identifier that is utilized, and will depend on the particular format of the log data is generated and stored in the particular endpoint management system that the method is being performed by.

In one example, an example of a first log data type that may be searched for at 306 is an "Exchange[Body: Device-ActionEvent" event log, which may be referred to herein simply as DeviceActionEvent. The DeviceActionEvent includes both a device identifier and user information, as well as both an event log chain identifier and an action type.

In another example, an example of a first log data type that may be searched for at 306 is an "Exchange[Body: PolicyUpdatedEvent" event log, which may be referred to herein simply as PolicyUpdatedEvent. The PolicyUpdatedEvent includes a user identifier, in the form of a userGuid value, and user information, but does not include a device identifier. The PolicyUpdateEvent may also include an event log chain identifier and an action type.

At 308, pairs of generic identifiers and associated specific data are identified. In general, the first set of log data that is identified at 306 may include multiple pairs of generic identifiers and associated specific data. For example, with reference to the endpoint management system 200 described previously, the system 200 includes multiple endpoints 204-1 to 204-N that each have a device identifier and an associated user such that the event logs of the first log data type will comprise event logs associate with different ones of the endpoints 204-1 to 204-N, which will each include a unique device identifier and user information pair. In some cases, a single user may be associated with more than one endpoint 204-1 to 204-N, in which case a single user may be associated with multiple device identifiers. Similarly, the EMS 200 may have multiple different users, and therefore the events logs of the first log data type may include multiple different pairs of user identifiers and user information.

Further, the enterprise server 214 of the example endpoint management system 200 may perform multiple actions with each action having a unique event log chain identifier, and therefore log events of the first log data type may include multiple pairs of event log chain identifiers and action types.

As disclosed above, when the event log chain identifier is associated with a particular one of the endpoint devices, the first log data type may include additional information such as the operating system of the particular endpoint, an enrollment type of the particular endpoint, an enrollment state of the particular endpoint, and a serial number of the particular endpoint. In this example, the pairing at 308 may include pairing each event log chain identifier with any of this additional data, in addition to pairing the event log chain identifier with the action type.

At 310, a search of the log data for event logs that include the generic identifier is performed for each generic identifier of the pairs identified at 308. Each search performed at 310 identifies a second set of log data that includes the generic identifier but not the specific data for one pair identified at 308.

As described above, one user may be associated with multiple endpoints 204-1 to 204-N, and therefore with multiple device identifiers. In this case, a search conducted at 310 may include a search of all of the device identifiers associated with a particular user such that the second set of log data includes the event logs that are associated with all of the endpoints 204-1 to 204-N that are associated with that user.

At 312, the events logs of the second set of log data are updated to include the specific data. In one example, each of the event logs of the second set of log data that include a device identifier of an endpoint that is associated with a particular user are updated to include the user information associated with the user. In another example, each of the event logs of the second set of log data that include a user identifier of a particular user are updated to include the user information associated with the user.

In yet another example, each of the event logs of the second set of log data that includes an event log chain identifier associated with a particular event or action, the event logs are updated with the action type associated with that event or action. In cases in which the event log chain identifier relates to one particular endpoint, as described previously, updating at 312 may include adding the additional information to the event logs of the second set of log data. As described above, the additional information that may be added at 312 may be one or more of the operating system of the particular endpoint, an enrollment type of the particular endpoint, an enrollment state of the particular endpoint, and a serial number of the particular endpoint.

Once the log data is updated at 312, the log data may optionally be filtered at 314 based on the specific data such as, for example, based on a particular user or a particular action type, and the filtered log data may be displayed on a display. The filtering at 314 may be performed in response to input from, for example, the administrator device 210 of the endpoint management system 200 shown in FIG. 2, and the filtered log data may be displayed on a display (not shown) of the administrator device 210.

Displaying the filtered log data at 314 may include displaying an error list of the errors that most recurrent in the filtered log data. Displayed error list may include, for example, displaying a predetermined number of the most recurrent errors. In an example, the hundred most recurrent errors are displayed. In other examples, any number of the most recurrent errors may be displayed.

Optionally, at 316, when the error list is displayed with the filtered log data, each error included in the error list is searched in an error tracking application. The error tracking application may be any type of database that provides solutions to errors including, for example, internal or external databases, a web based search engine, a wiki. The search at 316 may be conducted by searching for, for example, the error code associated with the error, or by searching the error message, or a portion of the error message, itself. The results of the search are displayed together with the errors displayed in the error list. In an example, hyperlinks to the entries in the error tracking application that are returned in response to the search. In an example, a predetermined number of the search results may be displayed. For example, hyperlinks to five results for each error that is searched may be displayed. In an example, the predetermined number of results for which hyperlinks are displayed may be the predetermined results having the highest relevance score, or the results having the most recent creation date, or may be the first predetermined number of results that are returned for the search.

Referring to FIG. 4A through 4C, with continued reference to FIG. 3, an example of detecting and identifying an endpoint management event failure in an endpoint management system according the present disclosure is provided. The example method shown in FIG. 4A through 4C illustrates one possible method for detecting and identifying an endpoint management event failure in an endpoint management system according to the method described previously with reference to FIG. 3.

FIG. 4A shows an example event log 402 of a first log data type that is included in a first set of log data identified by the searching performed at 306, as described above. The first log data type of the event log 402 is DeviceActionEvent, as indicated at 404. The example event log 402 shown in FIG. 4A includes three generic identifiers and two specific data types. The generic identifiers include an event log chain identifier 406 associated with a transaction, event, or action, shown in FIG. 4A as "correlationId":"7f39f23e-fd34-4c5d-ba54-4012ad1e9e9". The generic identifiers also include two identifier associated with a user: a device identifier 408 of an endpoint associated with the user, shown in FIG. 4A as "perimeterUuid":"cf830779-5c65-4c57-b055-168526df896e" and a user identifier 409 of the user, shown in FIG. 4A as "userGuid":"67a85ddd-caed-4f2c-9a03-aef8e9e36087". The specific data in the example shown in FIG. 4A are: an action type 410, shown in FIG. 4A as "deviceActionType":"SEND_POLICY"}, and user information including user name 412 and email address 414, shown in FIG. 4A as "userName":"firstnamelastname" and "emailAddress":"firstnamelastname@company.com", respectively.

After the event log chain identifier 406 is associated with the action type 410, or the identifier associated with the user, e.g., either the device identifier 408 or user identifier 409, is associated with the user information 412 and 414, or both, as described above with reference to 308 in FIG. 3, then searches may be performed utilizing the generic identifiers to determine the second set of log data, as described above with reference to 310 in FIG. 3.

FIG. 4B shows an example of a second set of log data 416 that is identified by searching for the device identifier 408. The second set of log data 416 includes four event logs 418a through 418d, all of which include the device identifier 406, "cf830779-5c65-4c57-b055-168526df896e", shown in bold in FIG. 4B. As described above, once the second set of log data 416 is determined, event logs 418a through 418d included in second set of log data 416 are updated to include the corresponding specific data, in this example one or both of the user name 412 and the email address 414.

FIG. 4C shows another example of a second set of log data 420 that is identified by searching for the event log chain identifier 406. The second set of log data 420 in this example includes 8 event logs 422a through 422h, all of which include the event log chain identifier 406, "7f39f23e-fd34-4c5d-ba54-4012ad1e9e9", shown in bold in FIG. 4C. As described above, once the second set of log data 420 is determined, the event logs 422a through 422h included in the second set of log data 420 are updated to include the corresponding activity data 410, which in this example is "SEND_POLICY". As described previously, if the even chain associated with the event log chain identifier 406 relates to only one endpoint, the event logs 422a through 422h may be updated to include additional information associated with the endpoint such as, for example, one or more of the operating system of the particular endpoint, an enrollment type of the particular endpoint, an enrollment state of the particular endpoint, and a serial number of the particular endpoint.

In the examples shown in FIG. 4A through 4C, the event logs 418a through 418d and the event logs 422a through 422h included in the example second sets of log data 416 and 420 are raw event logs. However, it will be appreciated that, rather than searching the raw log data and updating the raw log data as described with reference to FIG. 4A through 4C, the searching may be performed utilizing an indexed database that is generated by parsing the raw event logs and including in the parsed data into different fields of the indexed database.

In this case, the rather than, or in addition to, updating the raw event logs 418a through 418d and 422a through 422h, the entries in the indexed database that correspond to the event logs 418a through 418d are updated to include one or both of the user name 412 and email address 414, and the entries in the indexed database that correspond to the event logs 422a through 422h are updated to include the action type 410, and any additional information associated with the endpoint in the case in which the event log chain identifier relates to only one endpoint.

Figure 5:
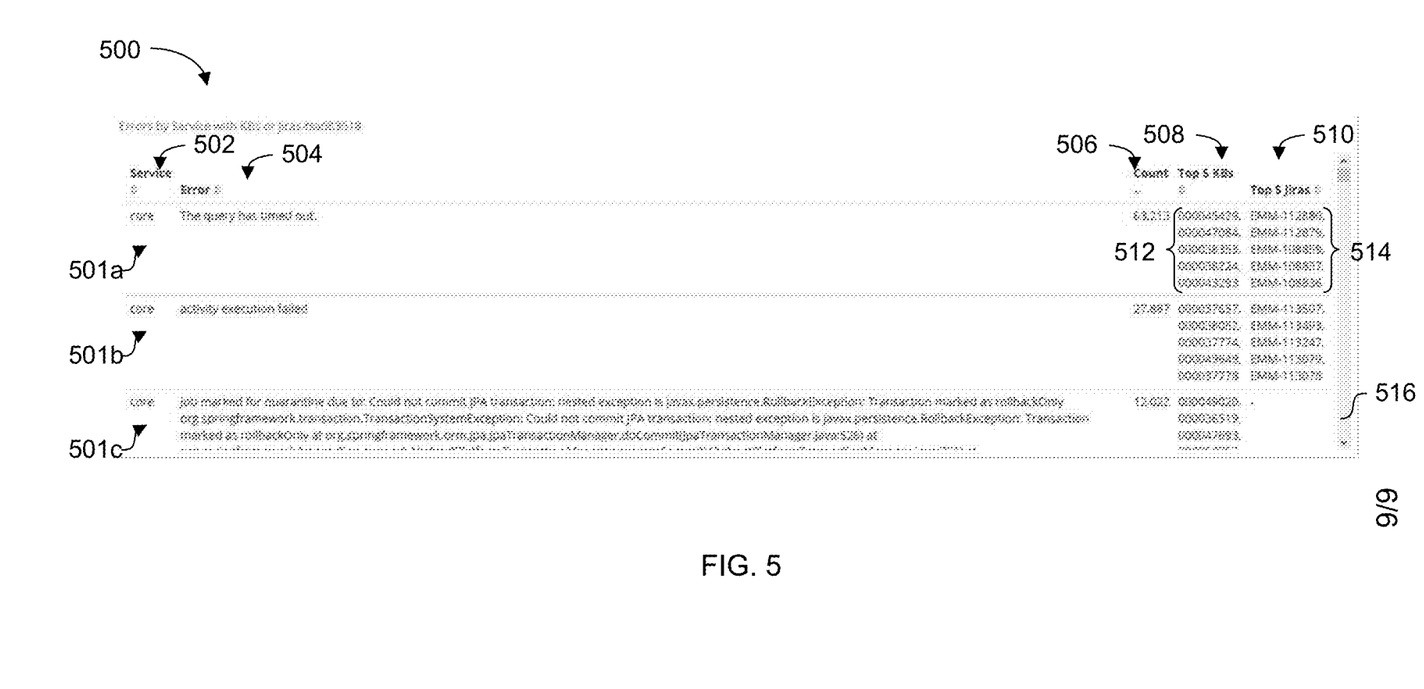
FIG. 5 is an example of a user interface for displaying an error list in accordance with the disclosure.

Referring now to FIG. 5, an example of a user interface 500 utilized to display a list of most recurrent errors in log data, as described previously with reference to 314 in FIG. 3, is shown. As described above, the user interface 500 may display a list that includes a predetermined number of the most recurrent errors in log data that has been filtered based on specific data, such as a user name, and email address, or an action type. The predetermined number of errors included in the list displayed in user interface 500 may be 100, or any other number, and may be user-configurable. The user interface 500 may be displayed on a device associated with an administrator of an endpoint management system, such as a display of the administrator device 210 of the endpoint management system 200 shown in FIG. 2.

The example user interface 500 includes a number of rows 501a through 502c, each row being associated with one of the errors of the list of errors. The error list displayed in the example user interface 500 may be scrollable by, for example, scroll bar 516.

The user interface 500 includes a service column 502 that includes the service in which the error was reported, an error column 504 that includes a description of the error, a count column 506 that includes the number of times the particular error of each row occurs in the filtered log data, a first issue tracking application results column 510, and a second issue tracking application results column 512.

As described previously, hyperlinks to entries having highest relevance score that are returned in response to a search for solutions in an issues tracking application may be displayed. In the example user interface 500 shown in FIG. 5, results relating to two issue tracking applications are displayed. In the example shown in FIG. 5, the first issue tracking application is a knowledge base (KB) issue tracking application, and the second issue tracking application is a Jiras issue tracking application. It is understood that in other examples, results from a greater or fewer number of issue tracking application may be displayed, or from different issue tracking applications than the KB and Jiras results shown in the example in FIG. 5.

In the example shown, the first issue tracking application results column 508 includes hyperlinks 512 to the top five results for each error, which are the five results having the highest relevance score for each search in the first issue tracking application. Similarly, the second issue tracking application results column 510 includes hyperlinks 514 to the top five results for each error, which are the five results having the highest relevance score for each search in the second issue tracking application. It is understood that the number of hyperlinks 512 and 514 included in each of the columns 508 and 510 may be greater or fewer than five, and need not be the same for each of the columns 508 and 510. In response to selecting on one hyperlink of the hyperlinks 512 and 514 a browser, for example, will be displayed that includes the entry in the issue tracking application that is associated with the selected hyperlink.

The present disclosure describes a method and apparatus for generating log data having increased filterability in an endpoint management system. Log data generated in an endpoint management system generally includes a generic identifier, such as a device identifier of an endpoint that is associated with event log, or a correlation ID of the particular action associated with the event log, or both. However, an administrator of an endpoint management system typically does not know, or does not have ready access, to the generic identifier that is associated with specific data that the administrator does know, such as an endpoint user's user name or email address or an action type that has been performed within the endpoint management system. By updating log data such that event logs include this specific data in the manner described in the present disclosure, facilitates an administrator filtering through log data based on specific data that the administrator has ready access to, which may reduce the amount of time required to troubleshoot issues experienced in the endpoint management system, and reduce downtime in such systems. Further, having access to data filtered by the specific data, such as a particular policy update, may facilitate an administrator of an endpoint management system identifying trends of issues across the different endpoints or users, which may facilitate the administrator identifying an issue before any users have contacted the administrator or even become aware that an issue exits. Additionally, identifying such trends in issues may facilitate software developers to identify issues that are being experienced by multiple users in order to proactively address these issues in software updates.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A device for detecting and identifying an endpoint management event failure in an endpoint management system, the device comprising:
 a processor configured to:
  generate event logs associated with the endpoint management system;
  store log data comprising the generated event logs in a database;
  identify a first set of log data by searching the log data for a first log data type, the first log data type having a data structure that includes:
   both an alphanumeric identifier associated with a user and user information, the user information including a user's name, a user's login name, or a user's email address, or
   both an alphanumeric event log chain identifier and an action type;
  when the first log data type includes both the alphanumeric identifier associated with the user and the user information, identify pairs of the alphanumeric identifier associated with a user and the user information in the first set of log data;
  when the first log data type includes both the alphanumeric event log chain identifier and an action type, identify pairs of the alphanumeric event log chain identifier and the action type, in the first set of log data;

for each of the identified pairs:
identify a second set of log data that includes:
when the identified pair includes an alphanumeric identifier associated with the user and user information, the alphanumeric identifier associated with a user but not the corresponding user information, wherein identifying the second set of log data is performed by searching the log data for event logs that include the one of the identifier associated, and when the identified pair includes an alphanumeric event log chain identifier and an action type, the alphanumeric event log chain identifier but not the corresponding action type, wherein identifying the second set of log data is performed by searching the log data for event logs that include the event log chain identifier; and update log data stored in the database by adding, for each of the event logs of the identified second set of log data:
the user information when the identified pair includes an alphanumeric identifier associated with the user and user information, and
the action type when the identified pair includes an alphanumeric event log chain identifier and an action type.

2. The device according to claim 1, further comprising a display in communication with the processor, and the processor further configured to filter the log data based on the user information or the action type, and display on the display the filtered log data.

3. The device according to claim 2, wherein displaying the filtered log data comprises displaying an error list that includes a predetermined number of the errors most frequently occurring in the filtered log data.

4. The device according to claim 3, the processor further configured to, for each error included in the error list, search an issue tracking application for solutions to the error to determine one or more entries in the issue tracking application associated with the error, and wherein displaying the list of most common errors includes displaying, for each error included in the error list, one or more hyperlinks to the one or more entries, respectively, in the issue tracking application.

5. The device according to claim 1, wherein the first log data type is a DeviceActionEvent log.

6. The device according to claim 1, wherein the alphanumeric identifier associated with a user is a permeterUuid value of an endpoint associated with the user.

7. The device according to claim 1, wherein the alphanumeric identifier associated with a user is a userGuid value associated with the user.

8. The device according to claim 1, wherein the alphanumeric event log chain identifier is associated with event logs associated with a particular endpoint and the first log data type includes both the alphanumeric event log chain identifier and an action type, the processor further configured to add additional information to the identified second set of event logs that include the alphanumeric event log chain identifier, the additional information include one or more of the operating system of the particular endpoint, an enrollment type of the particular endpoint, the enrollment status of the particular endpoint, and a serial number of the particular endpoint.

9. The device according to claim 1, wherein the alphanumeric event log chain identifier is a Correlation-ID value and the action type is a deviceActionType.

10. A non-transitory computer-readable medium having stored thereon computer-readable code executable by a processor to cause the processor to:
generate event logs associated with an endpoint management system;
store log data comprising the generated event logs in a database;
identify a first set of log data by searching the log data for a first log data type, the first log data type having a data structure that includes:
both an alphanumeric identifier associated with a user and user information, the user information including a user's name, a user's login name, or a user's email address, or
both an alphanumeric event log chain identifier and an action type;
when the first log data type includes both the alphanumeric identifier associated with the user and the user information, identify pairs of the alphanumeric identifier associated with a user and the user information in the first set of log data;
when the first log data type includes both the alphanumeric event log chain identifier and an action type, identify pairs of the alphanumeric event log chain identifier and the action type, in the first set of log data;
for each of the identified pairs:
identify a second set of log data that includes:
when the identified pair includes an alphanumeric identifier associated with the user and user information, the alphanumeric identifier associated with a user but not the corresponding user information, wherein identifying the second set of log data is performed by searching the log data for event logs that include the one of the identifier associated, and
when the identified pair includes an alphanumeric event log chain identifier and an action type, the alphanumeric event log chain identifier but not the corresponding action type, wherein identifying the second set of log data is performed by searching the log data for event logs that include the event log chain identifier; and
update log data stored in the database by adding, for each of the event logs of the identified second set of log data:
the user information when the identified pair includes an alphanumeric identifier associated with the user and user information, and
the action type when the identified pair includes an alphanumeric event log chain identifier and an action type.

11. The non-transitory computer-readable medium according to claim 10, wherein the computer-readable code executable by the processor further causes the processor to further comprising to filter the log data based on the user information or the action type, and display on a display the filtered log data.

12. The non-transitory computer-readable medium according to claim 11, wherein displaying the filtered log data comprises displaying an error list that includes a predetermined number of the errors most frequently occurring in the filtered log data.

13. The non-transitory computer-readable medium according to claim 12, wherein the computer-readable code executable by the processor further causes the processor to, for each error included in the error list, search an issue tracking application for solutions to the error to determine one or more entries in the issue tracking application associated with the error, and wherein displaying the list of most common errors includes displaying, for each error included in the error list, one or more hyperlinks to the one or more entries, respectively, in the issue tracking application.

14. The non-transitory computer-readable medium according to claim 10, wherein the first log data type is a DeviceActionEvent log.

15. The non-transitory computer-readable medium device according to claim 10, wherein the alphanumeric identifier associated with a user is a permeterUuid value of an endpoint associated with the user.

16. The non-transitory computer-readable medium according to claim 10, wherein the alphanumeric identifier associated with a user is a userGuid value associated with the user.

17. The non-transitory computer-readable medium according to claim 10, wherein the alphanumeric event log chain identifier is associated with event logs associated with a particular endpoint and the first log data type includes both the alphanumeric event log chain identifier and an action type, wherein the computer-readable code executable by the processor further causes the processor to add additional information to the identified second set of event logs that include the alphanumeric event log chain identifier, the additional information include one or more of the operating system of the particular endpoint, an enrollment type of the particular endpoint, the enrollment status of the particular endpoint, and a serial number of the particular endpoint.

18. The non-transitory computer-readable medium according to claim 10, wherein the alphanumeric event log chain identifier is a Correlation-ID value and the action type is a deviceActionType.

* * * * *